US012811022B2

(12) United States Patent
Santiago et al.

(10) Patent No.: US 12,811,022 B2
(45) Date of Patent: Nov. 24, 2026

(54) LOW TEMPERATURE LOW-ABUNDANCE ATOMIC OBJECT DISPENSING

(71) Applicant: Quantinuum LLC, Broomfield, CO (US)

(72) Inventors: Jessica M. Santiago, Broomfield, CO (US); Andrew Schaffer, Broomfield, CO (US)

(73) Assignee: Quantinuum LLC, Broomfield, CO (US)

( * ) Notice: Subject to any disclaimer, the term of this patent is extended or adjusted under 35 U.S.C. 154(b) by 415 days.

(21) Appl. No.: 18/462,913

(22) Filed: Sep. 7, 2023

(65) Prior Publication Data

US 2024/0112825 A1 Apr. 4, 2024

Related U.S. Application Data

(60) Provisional application No. 63/412,247, filed on Sep. 30, 2022.

(51) Int. Cl.
*G21G 4/04* (2006.01)
*G06N 10/40* (2022.01)
*G21K 1/00* (2026.01)

(52) U.S. Cl.
CPC ............... *G21G 4/04* (2013.01); *G06N 10/40* (2022.01); *G21K 1/00* (2013.01)

(58) Field of Classification Search
CPC ............ G21G 4/04; G21G 1/04; G06N 10/20; G06N 10/40; G21K 1/00
See application file for complete search history.

(56) References Cited

U.S. PATENT DOCUMENTS 6,319,554 B1 * 11/2001 Natarajan ............... C23C 16/44 427/124
2002/0162419 A1 * 11/2002 Yamamura ................ C22B 9/14 266/205
2022/0062938 A1 * 3/2022 Kokish .................... H05H 3/02

FOREIGN PATENT DOCUMENTS

JP S49-028878 B 7/1974
JP H06-176735 A 6/1994
JP 2010-515036 A 5/2010
KR 2001-0051317 A 6/2001

OTHER PUBLICATIONS https://chem.libretexts.org/Courses/Oregon_Tech_PortlandMetro_Campus/OT_-_PDX_-_Metro%3A_General_Chemistry_II/08%3A_Crash_Course_on_Kinetics_Equilibrium_and_Thermodynamics/8.03%3A_Factors_Affecting_Reac-Chemistry LibreTexts, 2020 (Year: 2020).*

(Continued)

*Primary Examiner* — David E Smith
(74) *Attorney, Agent, or Firm* — Alston & Bird LLP

(57) ABSTRACT

Methods and dispensers for dispensing atomic objects are provided. An example method for dispensing atomic objects includes depositing a reaction agent and a composition comprising the atomic objects inside a crucible chamber of a crucible; and heating the composition comprising the atomic objects to an atomizing reaction temperature to cause an atomizing chemical reaction to occur. The reaction component comprises a material that is a participant in the atomizing chemical reaction, the result of the atomizing chemical reaction is elemental atomic objects, and (c) the elemental atomic object is dispensed during the atomizing chemical reaction.

14 Claims, 6 Drawing Sheets

(56) References Cited

OTHER PUBLICATIONS

National Isotope Development Center (NIDC), "Barium-133 Product Information", Dec. 20, 2019, retrieved from the Internet at URL:https://www.isotopes.gov/products/barium on Dec. 11, 2023, 1 page.
Outgoing—ISA/210—International Search Report Mailed on Jan. 2, 2024 for WO Application No. PCT/US23/074085, 4 page(s).
Outgoing Written Opinion of the ISA Mailed on Jan. 2, 2024 for WO Application No. PCT/US23/074085, 7 page(s).
English Translation of JP Office Action, including Search Report dated Jun. 2, 2026 for JP Application No. 2025518706, 13 page(s).
JP Office Action, including Search Report Mailed on Jun. 2, 2026 for JP Application No. 2025518706, 11 page(s).

* cited by examiner

LOW TEMPERATURE LOW-ABUNDANCE ATOMIC OBJECT DISPENSING

CROSS-REFERENCE TO RELATED APPLICATIONS

This application claims priority to and the benefit of U.S. Provisional Application No. 63/412,247, titled "LOW TEMPERATURE LOW-ABUNDANCE ATOMIC OBJECT DISPENSING METHODS," filed Sep. 30, 2022, the contents of which is incorporated by reference herein in its entirety.

TECHNICAL FIELD

Various embodiments relate to apparatuses, systems, and methods relating to dispensing low-abundance atomic objects. For example, some example embodiments relate to the dispensing of low-abundance atomic objects at low chemical reaction temperatures.

BACKGROUND

An ion trap can use a combination of electrical and magnetic fields to capture a plurality of atomic objects in a potential well. Atomic objects can be trapped for a number of purposes, which may include mass spectrometry, research, and/or controlling quantum states, for example. In some instances, the atomic objects to be trapped may only be available in small amounts. For example, the atomic objects may be radioactive or pose another safety concern in large amounts, be very expensive, be hard to obtain or make, and/or the like. Through applied effort, ingenuity, and innovation many deficiencies of prior atomic object dispensers and/or dispensing techniques have been solved by developing solutions that are structured in accordance with the embodiments of the present invention, many examples of which are described in detail herein.

BRIEF SUMMARY OF EXAMPLE EMBODIMENTS

Example embodiments provide methods, systems, apparatuses, computer program products and/or the like for the dispensing of atomic objects using only a small amount of a composition comprising the atomic objects and such that the kinetic energy of the dispensed atomic objects permits them to be trapped and/or confined within an atomic object confinement apparatus. For example, various embodiments may be used to load an atomic object confinement apparatus (e.g., a surface ion trap, a three-dimensional ion trap, a magneto-optical trap, and/or the like) with atomic objects that are only available in a small amount due to a safety, availability, and/or other concerns. For example, various embodiments provide methods for loading an atomic object confinement apparatus with radioactive atomic objects (e.g., $^{133}$Ba). In various embodiments, an atomic object is an ion or an atom.

In various embodiments, the atomic objects are available and/or provided as part of a composition comprising the atomic objects. In various embodiments, the composition comprising the atomic objects must undergo at least one decomposition and/or atomizing chemical reaction to generate elemental atomic objects (e.g., atomic objects that are individual atomic objects rather than part of a molecule).

According to an aspect of the present disclosure, a method for dispensing atomic objects is provided. In an example embodiment, the method comprises depositing a reaction agent and a composition comprising the atomic objects inside a crucible chamber of a crucible with the crucible disposed within a pressure-controlled chamber; heating the composition comprising the atomic objects to an atomizing reaction temperature to cause an atomizing chemical reaction to occur. The reaction component comprises a material that is a participant in the atomizing chemical reaction. A result of the atomizing chemical reaction is elemental atomic objects. The elemental atomic object is dispensed during the atomizing chemical reaction.

In an example embodiment, the atomizing chemical reaction is a reduction reaction and the material is a reducing agent in the atomizing chemical reaction. In an example embodiment, the atomic objects are barium (Ba) atoms, the reducing agent is tantalum (Ta), and the atomizing reaction temperature is less than 900° C. In an example embodiment, the reaction component comprises tantalum (Ta) powder. In an example embodiment, the reaction component comprises tantalum (Ta) mesh. In an example embodiment, the reaction component comprises tantalum (Ta) foil. In an example embodiment, the atomic objects are barium (Ba) atoms, the material is tantalum (Ta), and the atomizing reaction temperature is approximately 800° C. In an example embodiment, the method further comprises, before causing of the atomizing chemical reaction, heating the crucible to a decomposition reaction temperature to cause a decomposition chemical reaction to occur, and the atomizing chemical reaction is performed using at least a portion of molecules generated by the decomposition chemical reaction. In an example embodiment, the decomposition reaction temperature is approximately 600° C. In an example embodiment, a dispenser is coupled to a first pressure-controlled chamber during the decomposition chemical reaction and coupled to a second pressure-controlled chamber during the dispensing of the atomic objects. In an example embodiment, the method further comprises, before the causing of the atomizing chemical reaction, heating the crucible to a degassing temperature for a duration of at least one hour. In an example embodiment, the atomic objects are radioactive. In an example embodiment, the method further comprises trapping dispensed elemental atomic objects using an atomic object confinement apparatus. In an example embodiment, the atomic object confinement apparatus is a component of a quantum computer. In an example embodiment, the composition comprising the atomic objects is an aqueous solution. In an example embodiment, the atomic objects are barium (Ba) atoms and the composition comprising the atomic objects is barium nitrate.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 is a flowchart illustrating various processes, operations, and/or procedures for dispensing atomic objects, in accordance with an example embodiment.

FIG. 2A provides a cross-sectional view of an example dispenser, in accordance with an example embodiment.

Figure 4:
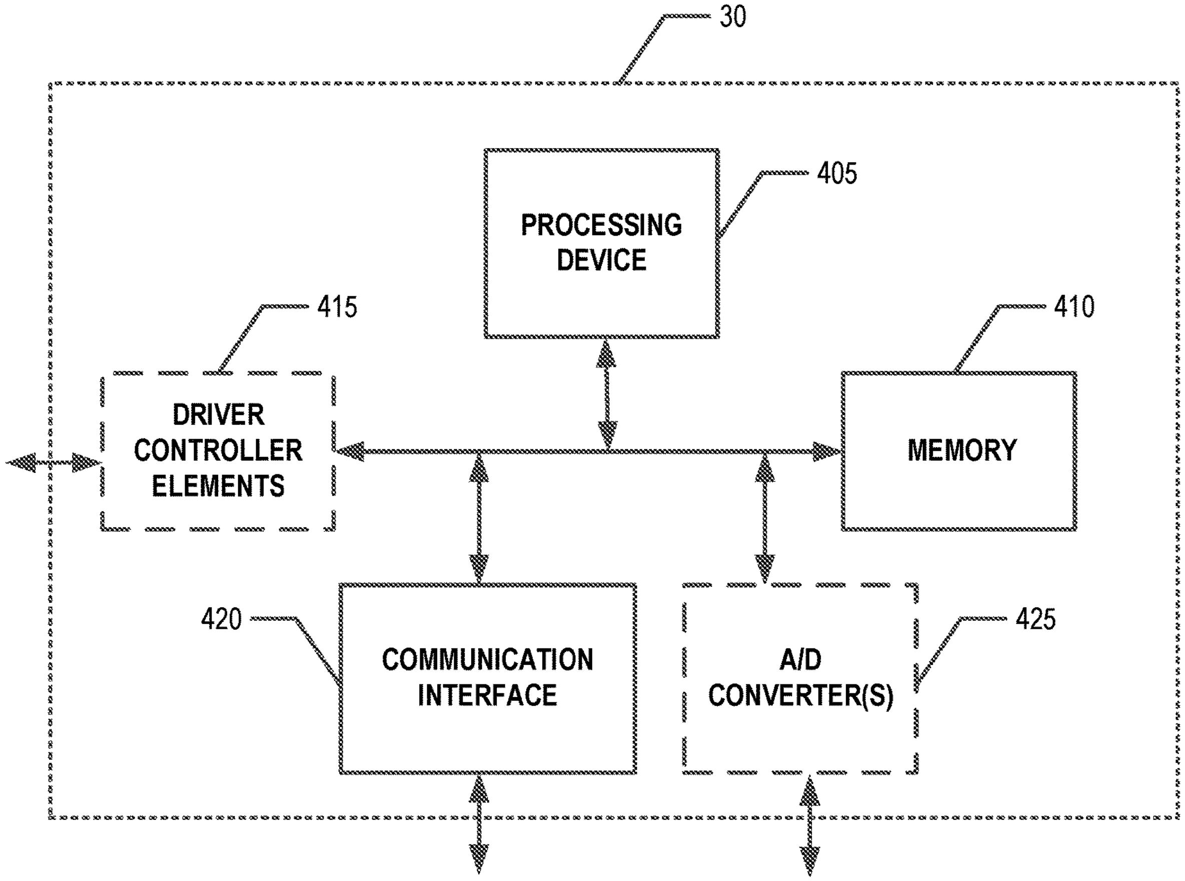

FIG. 4 provides a schematic diagram of an example controller of a quantum computer configured to perform one or more deterministic reshaping and/or reordering functions, according to various embodiments.

Figure 5:
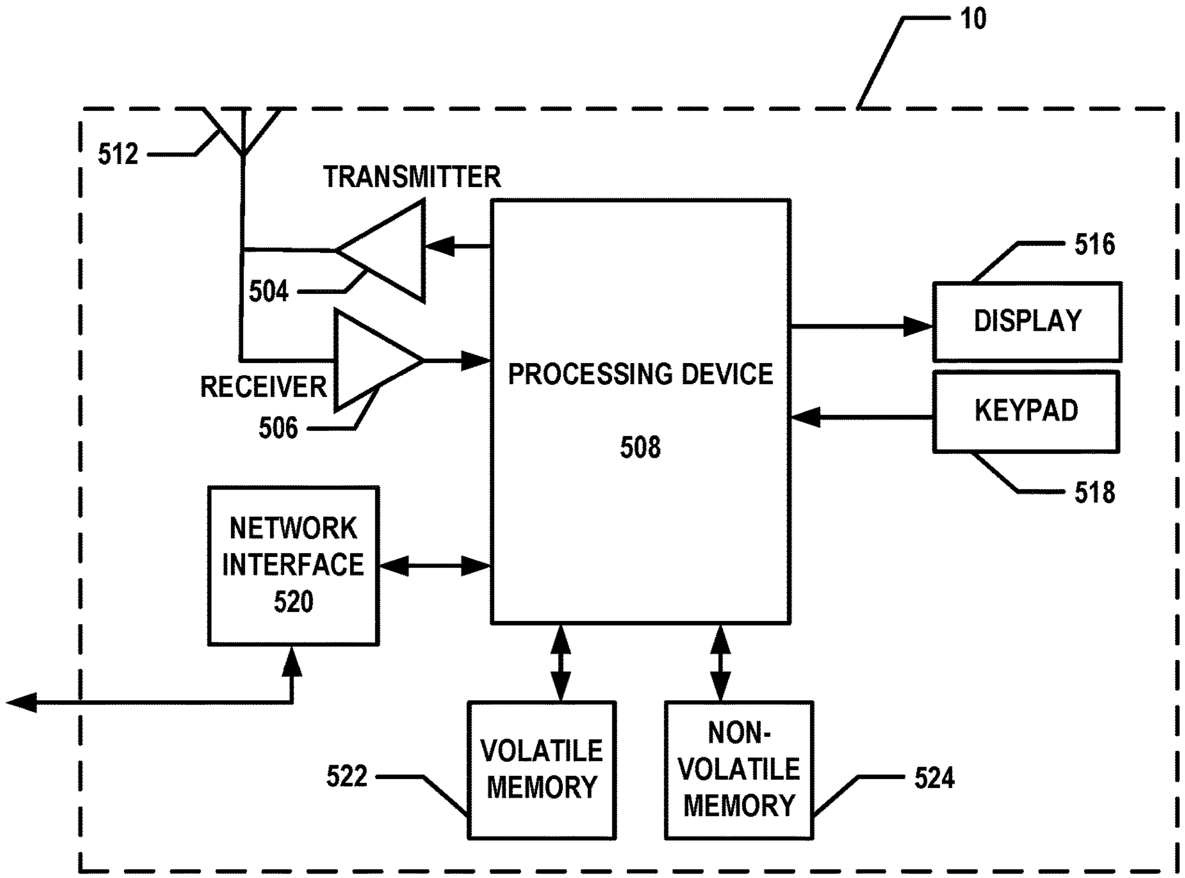

FIG. 5 provides a schematic diagram of an example computing entity of a quantum computer system that may be used in accordance with an example embodiment.

DETAILED DESCRIPTION OF SOME EXAMPLE EMBODIMENTS

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. The terms "generally," "substantially," and "approximately" refer to within engineering and/or manufacturing tolerances and/or within user measurement capabilities, unless otherwise indicated. Like numbers refer to like elements throughout.

In various embodiments, methods, apparatuses, systems, computer program products, and/or the like for the dispensing of atomic objects using only a small amount of a composition comprising the atomic objects. For example, various embodiments may be used to load an atomic object confinement apparatus (e.g., a surface ion trap, a three-dimensional ion trap, a magneto-optical trap, and/or the like) with atomic objects that are only available in a small amount due to safety, availability, and/or other concerns. For example, various embodiments provide methods and/or atomic object dispensers for loading an atomic object confinement apparatus with radioactive atomic objects (e.g., $^{133}$Ba). In various embodiments, an atomic object is an ion or an atom.

In various embodiments, the atomic objects are available and/or provided as part of a composition comprising the atomic objects. For example, in various embodiments, the atomic object is radioactive isotope (e.g., $^{133}$Ba), which may generally be available only in an aqueous solution (e.g., dilute salt solution). In various embodiments, the composition comprising the atomic objects must undergo at least one decomposition and/or atomizing chemical reaction to generate elemental atomic objects (e.g., atomic objects that are individual atomic objects rather than part of a molecule). For example, a composition comprising the atomic objects may be heated to a decomposing reaction temperature to cause a decomposition chemical reaction to occur to generate a partially decomposed composition comprising the atomic objects. The partially decomposed composition comprising the atomic objects may be heated to an atomizing reaction temperature to cause an atomizing chemical reaction to occur to generate elemental atomic objects. In some embodiments, the atomizing chemical reaction may be used to generate elemental atomic objects from the composition comprising the atomic objects (e.g., a decomposition chemical reaction may not be necessary in some embodiments).

As used herein, an atomizing chemical reaction is a chemical reaction that starts with the composition comprising atomic objects and/or a partially decomposed composition comprising the atomic objects and results in elemental atomic objects. As used herein, a decomposing chemical reaction is a chemical reaction that starts with a composition comprising atomic objects and results in a partially decomposed composition comprising the atomic objects but with a significant fraction of the atomic objects not being in elemental form (e.g., being part of a molecule).

In various embodiments, atomic objects are efficiently trapped and/or confined in an atomic object confinement apparatus into which the atomic objects are being loaded when at least a threshold ratio and/or percentage of atomic objects that are dispensed into the atomic object confinement apparatus are capable of being trapped by the atomic object confinement apparatus. An atomic object is capable of being trapped by the atomic object confinement apparatus when the kinetic energy of the atomic object dispensed into the atomic object confinement apparatus is no more than the potential well depth generated by the atomic object confinement apparatus at a loading position thereof. As should be understood, for a population of atomic objects (e.g., atomic objects being dispensed from the dispenser 200), the average kinetic energy $E_k$ of atomic objects in the population of atomic objects is given by $E_k=3/2kT$, where k is Boltzmann's constant and T is the temperature of the population of atomic objects in Kelvin. In an example embodiment, the atomizing reaction temperature and/or the potential well depth is configured so that the average kinetic energy $E_k$ of atomic objects being dispensed through the dispensing aperture is approximately 0.4-0.6 times the potential well depth (e.g., approximately 0.5 times the potential well depth) of the atomic object confinement apparatus at a loading location such that the atomic object confinement apparatus is capable of efficiently trapping atomic objects dispensed from the dispenser 200 (possibly after photoionization or otherwise ionizing the atomic objects).

In an example embodiment, the atomic objects are radioactive barium $^{133}$Ba. For example, due to the radioactivity of radioactive barium $^{133}$Ba, safety concerns prevent large amounts of radioactive barium $^{133}$Ba from being readily available and/or being able to be used safely. Moreover, due to the difficulty in generating radioactive barium $^{133}$Ba, which is a synthetic element and is not found in nature, radioactive barium is generally not available in an elemental form. In an example embodiment wherein the atomic objects are radioactive barium $^{133}$Ba, the composition comprising the atomic objects may be radioactive barium nitrate $^{133}Ba(NO_3)_2$. A decomposing chemical reaction may be performed at a decomposing reaction temperature such that the radioactive barium nitrate is decomposed into radioactive barium oxide (e.g., $^{133}Ba(NO_3)_2 \rightarrow BaO_{1+x}(s)+1.85NO+0.14NO_2+1.38O2+0.005N_2$). In this example, the decomposing reaction temperature is approximately 600° C. An atomizing chemical reaction may then be performed at an atomizing reaction temperature such that the radioactive barium oxide is decomposed to generate elemental radioactive barium (e.g., $5^{133}BaO+2Ta \rightarrow 5^{133}Ba(g)+Ta_2O_5$, when tantalum (Ta) is used as the reducing agent). In this example embodiment, the atomizing reaction temperature is about 800° C. In various example embodiments, the atomizing reaction temperature is at least 800° C. and may be greater than 1000° C. Various embodiments described herein advantageously enable a lower decomposing reaction and lower atomizing reaction temperature as compared to at least some traditional atomic object dispensing methods.

Figure 1:
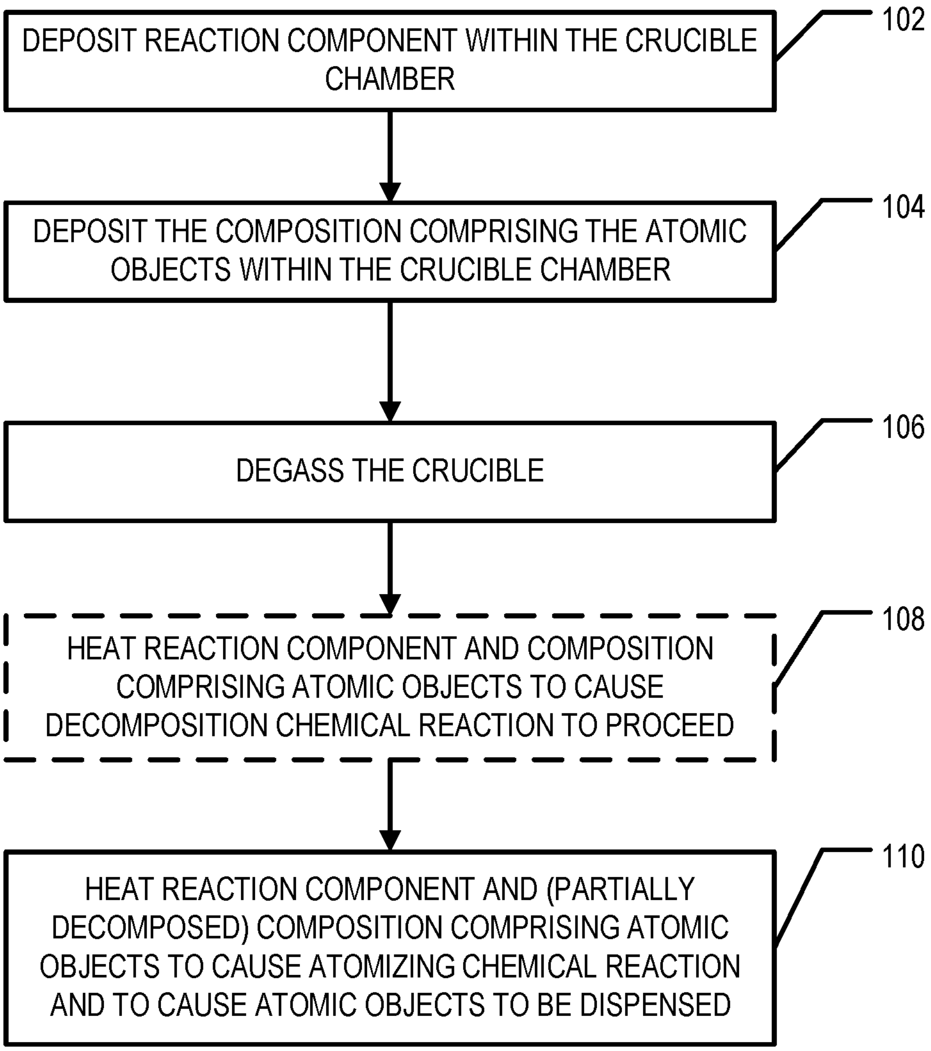
Figure 2A:
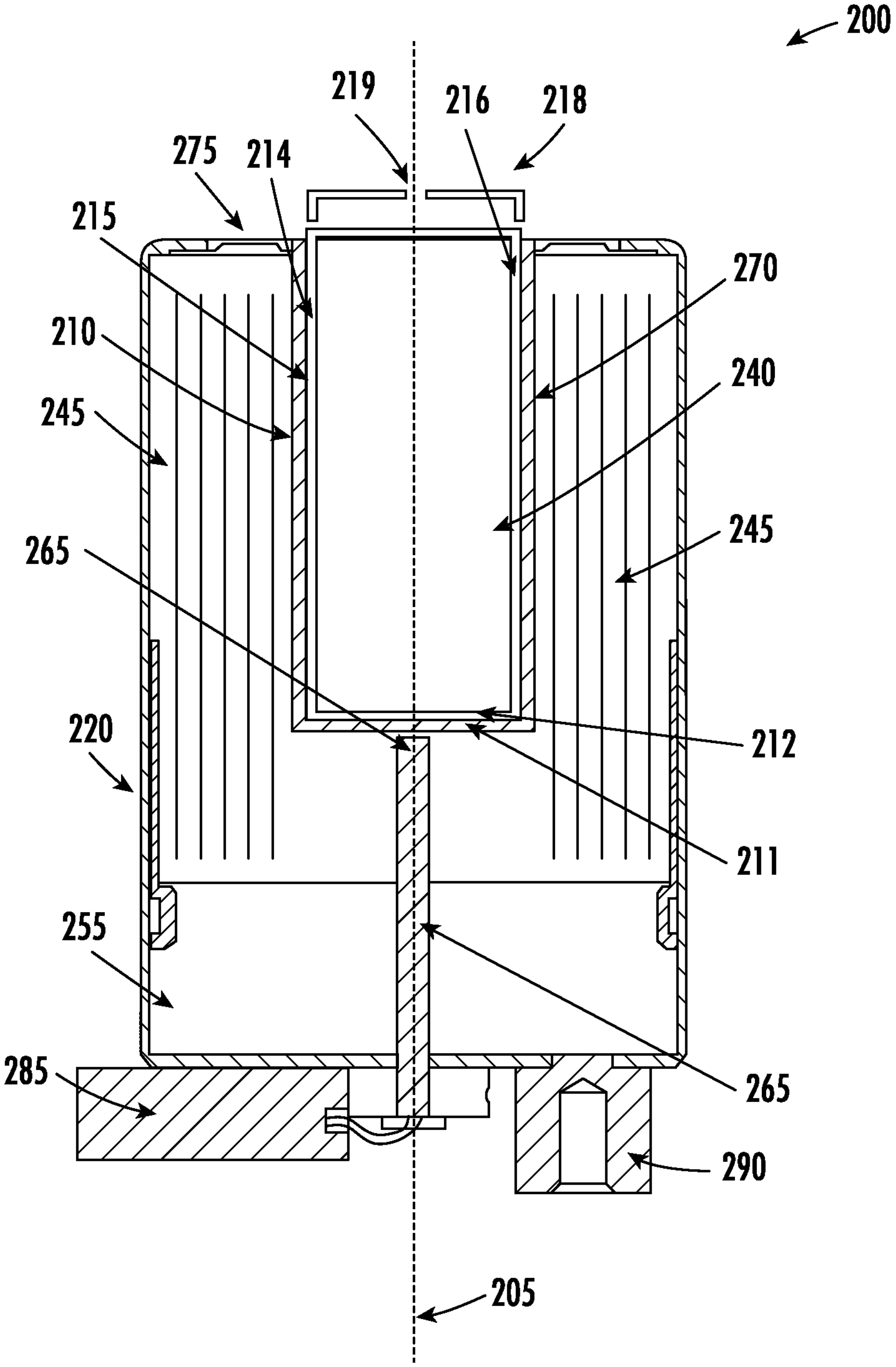
FIG. 2B is a close up view of an example crucible liner that may be used in a dispenser, in accordance with an example embodiment.
FIG. 2C is a close up view of an example aperture cap for a crucible liner that may be used in a dispenser, in accordance with an example embodiment.
FIG. 2D is a close up view of an example crucible liner with an aperture cap that may be used in a dispenser, in accordance with an example embodiment.

FIG. 1 provides a flowchart illustrating an example technique for dispensing atomic objects from a dispenser using only a small amount of a composition comprising the atomic objects. Some example embodiments of dispensers that may be used to dispense atomic objects using only a small amount of a composition comprising the atomic objects is shown in FIG. 2A. In particular, FIG. 2A illustrates a cross-section of some example embodiments of a dispenser 200 such as Radak I and/or a modified Radak I oven manufactured by Luxel.

In various embodiments, a dispenser 200 is an oven comprising a crucible 210 configured to have a decomposition and/or atomizing chemical reaction occur therein. For example, the crucible 210 defines a crucible chamber 240 within which a composition comprising the atomic objects and a reaction component may be disposed (e.g., deposited) to facilitate a decomposition and/or atomization chemical reaction.

The dispenser 200 further comprises a heating component 270 comprising at least one heating element and configured to heat at least a portion of the crucible 210. In example, embodiments, the heating component 270 comprises a heating element that surrounds at least a portion of the crucible 210. In various embodiments, the crucible 210 is disposed substantially within the heating component 270. For example, in various embodiments, the heating component 270 may define an interior cavity configured for receiving at least a portion of the crucible 210 therein, such that the heating element (e.g., filament, wire coil, and/or the like) of the heating component 270 surrounds at least a portion of the crucible (e.g., exterior thereof). In this manner, the heating component may be configured to uniformly heat the crucible 210.

As shown in FIG. 2A, in an example embodiment, the dispenser 200 further comprises an exterior cover 220 (e.g., a metal cover) configured to be disposed over the crucible 210 and the heating component 270. In an example embodiment, as shown in FIG. 2A, the crucible 210 and the heating component may be coupled and/or secured within an end of the exterior cover 220. For example, in some embodiments, the heating component 270 may be mounted on and/or comprise a base 255, and the crucible 210 may be disposed within the interior cavity defined by the heating component 270, such that the crucible 210 and the heating component 270 (or at least a portion thereof) may be secured within an end of the exterior cover 220. In some embodiments, the exterior cover 220 may be coupled and/or secured to the base 255 using one or more coupling mechanisms. For example, in the depicted embodiment of FIG. 2A, the exterior cover 220 may be coupled and/or secured to the base 255 such that the exterior cover screws into the base 255 using one or more attachment mechanisms. In some embodiments, the dispenser 200 may be coupled and/or secured to a flange (not shown) configured to secure the dispenser 200 to a pressure-controlled chamber such that the crucible 210 is disposed within the pressure-controlled chamber. For example, the flange may be configured to secure the dispenser 200 to a pressure-controlled chamber such that the atomic objects are dispensed into the pressure-controlled chamber. As shown in FIG. 2A, in some embodiments, the dispenser 200 may include a mounting boss 290 (e.g., a threaded mounting boss) configured for coupling and/or securing the dispenser to a flange (not shown). In the depicted embodiment of FIG. 2A, the mounting boss 290 may be a ¼-20 threaded mounting boss. However, it should be understood that in some embodiments, the mounting boss may be a threaded mounting boss of a different size.

The dispenser 200 illustrated in FIG. 2A also includes a baffle structure 245 (e.g. a radiation baffle structure) configured to shield a portion of the pressure controlled chamber (e.g., vacuum chamber) from heat emitted from the heating component 270 and/or the crucible 210 during decomposition chemical reaction and/or atomizing chemical reaction (e.g., crucible heat load). For example, in various embodiments, the baffle structure 245 is positioned between the exterior cover 220 and the crucible 210 (or the heating component 270, where the heating component comprises a heating element that surrounds at least a portion of the exterior of the crucible 210). In various embodiments the baffle structure 245 substantially surrounds the exterior of the crucible 210 and/or heating component 270.

Various other dispensers may be used in various embodiments, For example, in general, FIG. 2A illustrates an example embodiment of a dispenser 200 comprising a crucible 210 and a heating component 270 configured to heat the crucible 210. In some embodiments, the dispenser 200 may comprise a vapor shield 275. In some embodiments, the dispenser 200 may further comprise a cooling component (not shown) configured to cool at least a portion of the crucible 210.

In various embodiments, the crucible 210 comprises crucible walls and a crucible bottom end 211, wherein the crucible walls 214 and the crucible bottom end 211 define a tube. In an example embodiment, the tube defined by the crucible walls 214 is generally cylindrical and/or semi-conical. For example, a cross-section of the tube defined by the crucible walls 214 taken in a plane substantially perpendicular to a longitudinal axis 205 defined by the tube may be circular. In various other embodiments, the cross-section of the tube defined by the crucible walls 214 taken in a plane substantially perpendicular to a longitudinal axis 205 defined by the tube may have various shapes, such as a regular or irregular polygon, ellipse, and/or the like, as appropriate for the application. In various embodiments, the length of the tube defined by the crucible walls 214 in a direction substantially parallel to the longitudinal axis 205 is greater than a width (e.g., radius or diameter) of the tube in a plane substantially perpendicular to the longitudinal axis 205. For example, in one example embodiment, the length of the tube defined by the crucible walls 214 along the longitudinal axis 205 (e.g., the length of the crucible 210) is approximately one inch and an outer diameter of the tube in a cross-section taken generally perpendicular to the longitudinal axis 205 is approximately 0.5 inches. In some embodiments, the length of the tube defined by the crucible walls 214 along the longitudinal axis 205 may be greater than one inch or less than one inch. In some embodiments an outer diameter of the tube in a cross-section taken generally perpendicular to the longitudinal axis 205 may be greater than 0.5 inches or less than 0.5 inches. For example, in some embodiments, an outer diameter of the tube in a cross-section taken generally perpendicular to the longitudinal axis 205 may be within a range of 0.3 inches to 0.6 inches. In an example embodiment, the crucible 210 may have a length (e.g., the length of the tube defined by the crucible walls 214 along the longitudinal axis 205) of about 1.06 inches (27 mm), an outer diameter (e.g., outer diameter of the tube in a cross-section taken generally perpendicular to the longitudinal axis 205) of about 0.5 inches (12.8 mm) and an inner diameter (e.g., inner diameter of the tube in a cross-section taken generally perpendicular to the longitudinal axis 205) of about 0.35 inches (8.9 mm). In some embodiments, the crucible 210 may have an inner diameter that is greater than 0.35 inches or less than 0.35 inches. In various embodiments, the tube defines an interior cavity having a volume in the range of 0.5 cc to 2.5 cc. In various embodiments, the tube defines an interior cavity having a volume of approximately 1.0 cc.

In various embodiments, the bottom end 211 closes off one end of the tube defined by the crucible walls 214 and the bottom end 211. In various embodiments, the crucible walls 214 and the bottom end 211 are made of material (e.g., thermally conductive material) such as stainless steel, alumina, aluminum, and/or the like that enables heating of the crucible 210 (e.g., via the heating component 270). For example, the crucible walls 214 and the bottom end 211 are made of material that can withstand the temperature of the heating component passing to the crucible walls 214 and the bottom end 211 during the decomposition and/or atomizing chemical reaction without melting or otherwise deforming the crucible walls and/or the bottom end 211. In an example embodiment, the crucible walls 214 and/or the bottom end 211 have a melting temperature that is greater (e.g., significantly greater) than the atomizing reaction temperature. For example, the crucible walls 214 and/or the bottom end 211 may have a melting temperature that is greater than 1300° C.

Figure 2B:
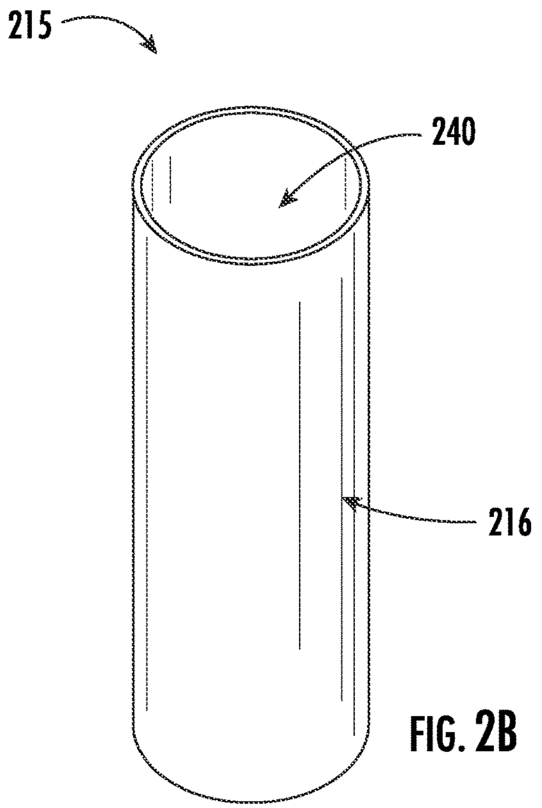

In various embodiments, a layer of another material may be disposed within the crucible 210. For example, in the embodiment of FIG. 2A, a crucible liner 215 is disposed within the crucible 210. FIG. 2B depicts a close up view of an example crucible liner 215. In various embodiments, the crucible liner 215 may be made of the same material as the reaction component. For example, in example embodiments where the reaction component comprises tantalum and the atomic objects are barium $^{133}$Ba, the crucible liner 215 may comprise tantalum (e.g., tantalum crucible liner). It should be understood that in other embodiments, the crucible liner 215 may be made of other materials, including tungsten, nickel, molybdenum, and/or the like, and may not be the same as the reduction agent.

In various embodiments, the crucible liner 215 comprises crucible liner walls 216 and a crucible liner bottom end 212 defining a tube. In an example embodiment, the tube defined by the crucible liner walls 216 and the crucible liner bottom end 212 is generally cylindrical and/or semi-conical. For example, a cross-section of the tube defined by the crucible liner walls 216 and the crucible liner bottom end 212 taken in a plane substantially perpendicular to a longitudinal axis 205 defined by the tube may be circular. In various other embodiments, the cross-section of the tube defined by the crucible liner walls 216 and the crucible liner bottom end 212 taken in a plane substantially perpendicular to a longitudinal axis 205 defined by the tube may have various shapes, such as a regular or irregular polygon, ellipse, and/or the like, as appropriate for the application. In various embodiments, the length of the tube defined by the crucible liner walls 216 and the crucible liner bottom end 212 in a direction substantially parallel to the longitudinal axis 205 is greater than a width (e.g., radius or diameter) of the tube in a plane substantially perpendicular to the longitudinal axis 205. For example, in one example embodiment, the length of the tube defined by the crucible liner walls 216 and the crucible liner bottom end 212 along the longitudinal axis 205 (e.g., the length of the crucible liner 215) is approximately 1.1 inches (27.65 mm) and an outer diameter of the tube defined by the crucible liner walls 216 and the crucible liner bottom in a cross-section taken generally perpendicular to the longitudinal axis 205 is approximately 0.345 inches (8.8 mm). In some embodiments, the length of the tube defined by the crucible liner walls 216 along the longitudinal axis 205 may be greater than 1.1 inches or less than 1.1 inches. In some embodiments an outer diameter of the tube defined by the crucible liner walls 216 and the crucible liner bottom end 212 in a cross-section taken generally perpendicular to the longitudinal axis 205 may be greater than 0.345 inches or less than 0.345 inches. For example, in some embodiments, an outer diameter of the tube defined by the crucible liner walls 216 and the crucible liner bottom end 212 in a cross-section taken generally perpendicular to the longitudinal axis 205 may be within a range of 0.2 inches to 0.5 inches. In an example embodiment, the crucible liner 215 may have a length (e.g., the length of the tube defined by the crucible liner walls 216 and the crucible liner bottom end 212 along the longitudinal axis 205) of about 1.1 inches (27.65 mm), an outer diameter (e.g., outer diameter of the tube defined by the crucible liner walls 216 and the crucible liner bottom end 212 in a cross-section taken generally perpendicular to the longitudinal axis 205) of about 0.345 inches (8.8 mm) and an inner diameter (e.g., inner diameter of the tube defined by the crucible liner walls 216 and the crucible liner bottom end 212 in a cross-section taken generally perpendicular to the longitudinal axis 205) of about 0.295 inches (7.5 mm). In some embodiments, the crucible 210 may have an inner diameter that is greater than 0.295 inches or less than 0.295 inches.

In various embodiments, the tube defined by the crucible liner walls 216 and the crucible liner bottom end 212 defines an interior cavity having a volume that is less that the volume of the interior cavity of the tube defined by the crucible walls 214 (e.g., the crucible liner 215 has a volume that is less than the volume of the crucible 210). In various embodiments, the tube defines an interior cavity having a volume in the range of 0.5 cc to 2.5 cc. In various embodiments, the tube defined by the crucible liner walls 216 and the crucible liner bottom end 212 defines an interior cavity having a volume of approximately 0.5 cc.

In various embodiments, the crucible liner bottom end 212 closes off one end of the tube defined by the crucible liner walls 216 and the crucible liner bottom end 212. In various embodiments, the crucible liner walls 216 and the crucible liner bottom end 212 are made of material (e.g., thermally conductive material) such as stainless steel, alumina, aluminum, and/or the like that enables heating of the crucible liner 215 (e.g., via the heating component 270). For example, the crucible liner walls 216 and the crucible liner bottom end 212 are made of material that can withstand the temperature of the heating component passing to the crucible liner walls 216 and the crucible liner bottom end 212 during the decomposition and/or atomizing chemical reaction without melting or otherwise deforming the crucible liner walls and/or the crucible liner bottom end 212. In an example embodiment, the crucible liner walls 216 and/or the crucible liner bottom end 212 have a melting temperature that is greater (e.g., significantly greater) than the atomizing reaction temperature. For example, the crucible liner walls 216 and/or the crucible liner bottom end 212 may have a melting temperature that is greater than 1300° C.

Figure 2C:
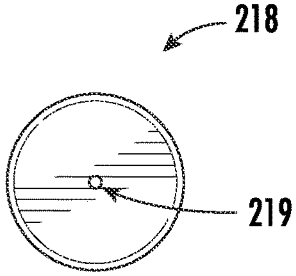
Figure 2D:
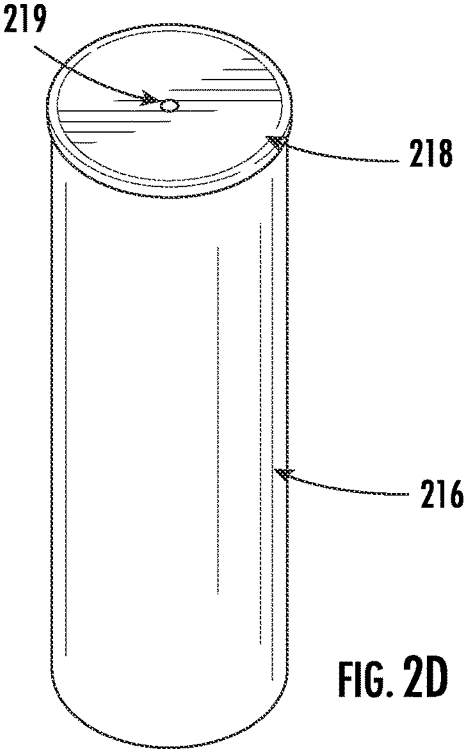

In various embodiments, the crucible liner 215 further comprises an aperture cap 218 that at least partially closes off the other end of the tube defined by the crucible liner walls 216 and the crucible liner bottom end 212 that is opposite the crucible liner bottom end 212. For example, the crucible liner bottom end 212 may close off a first end of the tube defined by the and the aperture cap 218 may at least partially close off a second, opposite end of the tube. For example, the aperture cap 218 may be releasably secured to the opposite end of the tube defined by the crucible liner walls 216 and the crucible liner bottom end 212. FIG. 2C depicts a close up view of an example aperture cap 218 and FIG. 2D depicts an example crucible liner 215 with an example aperture cap 218 secured to the crucible liner 215. In an example embodiment, the aperture cap 218 is secured to the opposite end of the tube via fasteners securing the aperture cap 218 to the crucible liner walls 216, adhesive securing the aperture cap 218 to the crucible liner walls, a friction fit of the aperture cap 218 to the crucible liner walls 216, and/or the like. In some embodiments, the dimensions (e.g., length) of the crucible liner 215 and the crucible 210 are selected such that, such that an upper portion of the crucible liner 215 extends beyond the crucible 210 when the crucible liner 215 is disposed within the crucible 210 to enable the aperture cap 218 to be adequately secured to the crucible liner (e.g., such that the aperture cap may snap onto the crucible liner snugly, where, for example, the aperture cap is secured to the crucible liner via friction fit). In an example, embodiment, the aperture cap 218 has a substantially circular shape. In an example embodiment, the aperture cap 218 is a disc. In various embodiments, the aperture cap 218 comprises a dispensing aperture 219 extending therethrough. In an example embodiment, the dispensing aperture 219 is centered in the aperture cap 218. In various embodiments, the dispensing aperture 219 is not centered in the aperture cap 218. In various embodiments, the elemental atomic objects are dispensed from the dispenser 200 through the dispensing aperture 219.

In an example embodiment, the dispensing aperture 219 has a diameter (measured in a plane substantially perpendicular to the longitudinal axis 205) of approximately 0.05-1.2 mm. For example, in some embodiments, the dispensing aperture 219 has a diameter (measured in a plane substantially perpendicular to the longitudinal axis 205) of approximately 0.5 mm. It should be understood, however, that in some embodiments, that the dispensing aperture 219 may have a diameter (measured in a plane substantially perpendicular to the longitudinal axis 205) that is different from the above examples. In an example embodiment, the aperture cap 218 may have a thickness of approximately 0.1 mm. For example, in some embodiments, the aperture cap 218 may have a thickness of about 0.127 mm. In an example embodiment, the diameter of the dispensing aperture 219 and the length of the crucible liner are configured to provide an at least semi-collimated beam of atomic objects directed toward a load hole and/or target component of an atomic object confinement apparatus. In an example embodiment, the aperture cap 218 comprises multiple dispensing apertures.

In various embodiments, the crucible liner walls 216, crucible liner bottom end 212, and aperture cap 218 define the crucible chamber 240 of the crucible 210. In various embodiments, the crucible chamber 240 has a volume in the range of 0.4 cc to 2.0 cc. In various embodiments, the crucible chamber 240 has a volume of approximately 0.5 cc. In various embodiments, the crucible chamber 240 is the volume and/or cavity within the interior of the crucible 210. For example, the decomposition chemical reaction and the atomizing chemical reaction may occur within the crucible chamber 240. In various embodiments, the crucible chamber 240 is dimensioned such that during operation the distance between the content (e.g. reaction component and a composition comprising the atomic objects) deposited within the crucible chamber 240 and the detector inside a residual gas analyzer (RGA) (e.g., configured to monitor the reaction progression) is about 6 inches. In various embodiments, the crucible 210 and/or the crucible liner 215 is removable.

As noted above, in various embodiments, the dispenser 200 comprises a heating component 270. In various embodiments, the heating component 270 comprises a heating element (e.g., a resistive heating element). In an example embodiment, the heating component 270 is operated by supplying an electric current and/or voltage to the heating element. For example, an electric current and/or voltage may be applied to the heating element to heat the composition comprising the atomic objects and/or a partially decomposed composition comprising the atomic objects. In various embodiments, the heating element may be a coil heater comprising heating filaments and/or coil wire that winds around at least a portion of the crucible 210. For example, an electric current and/or voltage may be applied to the heating element to heat the crucible 210 and/or the crucible liner 215. In example embodiments, the heating component 270 may be secured in electrical communication with electrical leads that may be used to supply electric current and/or voltage to the heating component (e.g., heating element of the heating component 270).

In an example embodiment, a composition comprising the atomic objects and a reaction component is disposed (e.g., deposited) within the crucible chamber 240. In various embodiments, the heating element may be secured in electrical communication with electrical leads that may be used to supply electric current and/or voltage to the heating element. When electric current and/or voltage are applied to the heating element, the heat element may cause the crucible 210 and/or crucible liner 215 to emit heat and cause the composition comprising the atomic objects, the crucible 210, and/or the crucible liner to be heated (e.g., to a decomposition reaction temperature and/or atomizing reaction temperature) such that the decomposition chemical reaction and/or atomizing chemical reaction may proceed. In various embodiments, the dispenser 200 may comprise one or more thermocouples 265 configured to enable monitoring of the temperature within the crucible chamber 240. As shown in FIG. 2A, the dispenser may include a thermocouple plug 285 coupled to the one or more thermocouples 265.

In some embodiments, the reaction component and the composition comprising the atomic objects are disposed within the crucible chamber 240 and may be mixed therein. In an example embodiment (e.g., where the atomic object is radioactive Barium $^{133}$Ba), the reaction component may comprise tantalum powder, tantalum mesh, and/or tantalum foil, wherein the reaction agent is tantalum. In various embodiments, using tantalum powder, tantalum mesh, and/or tantalum foil advantageously increases the surface area available for the decomposition chemical reaction and/or the atomizing chemical reaction. It should be understood, however, that in other embodiments, the tantalum reaction agent may be embodied in other forms.

When electric current and/or voltage are applied to the heating component 270 (e.g., heating element thereof), the heating element of the heating component 270 may emit heat and cause the composition comprising the atomic objects and/or partially decomposed composition comprising the atomic objects and/or at least a portion of the crucible 210 and/or crucible liner 215 to be heated (e.g., to a decomposition reaction temperature and/or atomizing reaction temperature) such that the decomposition chemical reaction and/or atomizing chemical reaction may proceed. In an example embodiment, the heating element is disposed exterior to the crucible chamber 240, the heating element may wind around at least a portion of the exterior of the crucible walls of the crucible.

In various embodiments, the decomposition chemical reaction, atomizing chemical reaction, and/or dispensing of the elemental atomic objects are performed with the crucible 210 located within a pressure controlled environment. For example, at least a portion of the dispenser 200 may be disposed within a pressure-controlled environment during the decomposition chemical reaction and/or atomizing chemical reaction. For example, the dispenser 200 may comprise a flange (not shown) configured to couple the dispenser 200 to a pressure controlled chamber such that the crucible 210 is disposed within the pressure-controlled chamber. For example, the flange may be configured to couple the dispenser 200 to a vacuum and/or cryostat chamber 40 (see FIG. 3) such that the crucible 210 is disposed within the vacuum and/or cryostat chamber. The portion of the dispenser 200 within the pressure controlled chamber may comprise the crucible 210 and at least a portion of the heating component 270. For example, the portion of the dispenser 200 disposed within the pressure-controlled chamber may be configured such that elemental atomic objects dispensed from the dispenser 200 through the dispensing aperture 219 are dispensed into the pressure-controlled chamber. In various embodiments, the portion of the dispenser 200 disposed outside of the pressure-controlled chamber may comprise a thermocouple component coupled to a thermocouple (as described above), one or more couplings and/or connections (e.g., couplings and/or connections to a cooling system, couplings between a thermocouple and thermocouple component, leads attached to heating element), and/or the like.

In various embodiments, the dispenser 200 may comprise various other components not described in detail herein. For example, the dispenser 200 may comprise one or more cooling components. In another example, the dispenser 200 may comprise one or more sensors and/or measuring devices configured to monitor the completeness and/or state of the decomposition chemical reaction, atomizing chemical reaction, and/or dispensing of the elemental atomic objects.

As noted above, FIG. 1 illustrates an example technique of dispensing elemental atomic objects using only a small amount of a composition comprising the atomic objects. Beginning with step/operation 102 shown in FIG. 1, a reaction component is disposed within the crucible chamber 240 (e.g., within the crucible liner). In various embodiments, the reaction component is weighed and deposited within the crucible 210. In an example embodiment, the reaction component comprises one or more materials that are participants in the atomizing chemical reaction. In an example embodiment, the reaction component comprises tantalum powder, wherein the reaction agent is tantalum. In some embodiments, the reaction component comprise tantalum mesh and/or tantalum foil. In various embodiments an amount of the reaction component (e.g., reaction agent thereof) is weighed before depositing in the crucible chamber 240 (e.g., a weighted amount of the reaction agent is deposited within the crucible liner). In various embodiments, using tantalum powder, tantalum mesh, and/or tantalum foil advantageously enables the use of a larger quantity of starting materials (e.g., reaction agent and/or composition comprising the atomic objects), hence longer lifetime.

At step/operation 104, the composition comprising the atomic objects is deposited within the crucible chamber 240. In various embodiments, the composition comprising the atomic object is in aqueous form and may be deposited within the crucible chamber 240 using a pipette (e.g., a micropipette). In various embodiments, the quantity/amount of the composition comprising the atomic objects that is deposited within the crucible chamber 240 is controlled. For example, in various embodiments, a measured amount of the composition comprising the atomic object is deposited within the crucible chamber 240 as noted above. In various embodiments, the quantity of the composition comprising the atomic object deposited within the crucible chamber 240 may depend on the amount of the reaction component deposited in the crucible chamber 240, and vice versa. For example, in an example embodiment, where the atomic object is radioactive Barium $^{133}$Ba and the reactive agent is tantalum, a molar ratio of the reaction agent to the composition comprising the atomic objects is about five to one respectively (e.g., 5:1 molar ratio of Ta:Ba). In the noted example embodiment, the molar ratio of the reaction agent to the composition comprising the atomic objects may be selected such that there is excess reaction agent in order to make sure to react all of the composition comprising the atomic objects. In various embodiments, the composition comprising the atomic objects is deposited within the crucible chamber 240 such that it is deposited on top of the reaction agent inside the crucible chamber 240.

In various embodiments, the crucible 210 (e.g., comprising the reaction agent and the composition comprising the atomic objects) is a heated at a drying temperature to remove liquid (e.g., water), leaving a dry composition comprising the atomic object and the reaction agent in the crucible chamber 240 (e.g., the mixture thereof). For example, in some embodiments, the composition comprising the atomic objects may be $Ba(NO3)_2$ and the reaction agent may be tantalum powder, wherein when the crucible 210 is heated, the liquid is removed, leaving barium nitrate dried salt on the tantalum powder reaction component. In some embodiments, the crucible 210 is heated using a hot plate (not shown). For example, in some embodiments, upon depositing the reaction component and the composition comprising the atomic objects within the crucible chamber 240 of the crucible 210, the crucible 210 is placed on a hot plate to remove the liquid (as described above). In some embodiments, a chemical reaction may be performed to obtain the composition comprising the atomic objects. In an example embodiment, wherein the atomic objects are radioactive barium, the composition comprising the atomic objects may be obtained as a result of a chemical reaction. For example, in some embodiments, the composition comprising the atomic objects may be barium nitrate $^{133}Ba(NO_3)_2$ and may be obtaining from a chemical reaction (e.g., $BaCl_2$+ $2AgNO_3 \rightarrow 2AgCl(s) + {}^{133}Ba(NO3)_2$).

At step/operation 106, at least the reaction component and the composition comprising the atomic objects are enclosed within the crucible chamber 240 (e.g., with the aperture cap 218 secured thereon), and the crucible 210 and/or crucible liner 215 in thermal communication with the heating component 270 (e.g., the heating element thereof). In an example embodiment, the dispenser 200 may then be secured to a first pressure-controlled chamber (e.g., via a flange). In an example embodiment, the crucible 210 and/or crucible liner 215 may be degassed and/or cleaned out while secured to the first pressure-controlled chamber by operation of the heating element of the heating component 270. For example, the heating element may be operated to heat at least a portion of the crucible 210 and/or crucible liner 215 such that any material within the crucible chamber 240 (e.g., other than the composition comprising the atomic objects is dispensed from the crucible chamber through the dispensing aperture 219. In an example embodiment, the degassing and/or cleaning out of the crucible 210 and/or crucible liner 215 may occur during the decomposition chemical reaction. In an example embodiment, where the atomic object is radioactive Barium $^{133}$Ba, the degassing temperature may be approximately 200° C. For example, in various embodiments, where the atomic object is radioactive Barium $^{133}$Ba, the degassing temperature may be at least 200° C. for a duration of at least one hour.

At step/operation 108, the heating element of the heating component 270 is used to heat the mixture comprising the reaction component and the composition comprising the atomic objects to cause a decomposition chemical reaction to proceed. For example, the heating component may heat the composition comprising the atomic objects to a decomposition reaction temperature which may cause the decomposition reaction to occur. A result of the decomposition chemical reaction is a partially decomposed composition comprising the atomic objects. In an example embodiment, at least a portion of the crucible (e.g., crucible chamber 240) is maintained at and/or around the decomposition reaction temperature (which may be a range of temperatures in an example embodiment) until formation of a byproduct of the decomposition chemical reaction is no longer detected within the crucible. For example, a residual gas analyzer (RGA), ion gauge, pressure gauge, and/or the like within the first pressure-controlled chamber may be used to detect when the byproduct (and/or other material) leaving the crucible chamber 240 via the dispensing aperture 219. When the RGA, ion gauge, pressure gauge, and/or the like stops detecting and/or detects a significant decrease in the amount of byproduct and/or other materials being dispensed through the dispensing aperture 219, it may be determined that the decomposition chemical reaction is complete. In various embodiments, a decomposition chemical reaction is not performed as the composition comprising the atomic objects may be decomposed to provide elemental atomic objects in a single atomizing chemical reaction. In an example embodiment, where the atomic object is radioactive Barium $^{133}$Ba, the decomposition temperature may be approximately 600° C. For example, in various embodiments, where the atomic object is radioactive Barium $^{133}$Ba, the decomposition chemical reaction comprise dwelling at approximately 600° C. for at least about one hour to fully decompose the barium nitrate.

In an example embodiment, after completion of the decomposition chemical reaction and/or degassing/cleaning of the crucible 210 and/or crucible liner 215, the dispenser 200 may be decoupled from the first pressure-controlled chamber and coupled to a second pressure-controlled chamber. In an example embodiment, the atomic object confinement apparatus is disposed within the second pressure-controlled chamber. By performing the decomposition chemical reaction and/or degassing/cleaning of the crucible 210 and/or crucible liner 215 in a first pressure-controlled chamber and dispensing the elemental atomic objects into a second pressure-controlled chamber, the second pressure-controlled chamber may be kept cleaner. For example, an experiment and/or the like may be carried out within the second pressure-controlled chamber without interaction or contamination by byproducts of the decomposition chemical reaction and/or other materials dispensed during the degassing/cleaning process. In an example embodiment, the atomizing chemical reaction is completed with the dispenser 200 coupled to the first pressure-controlled chamber and the dispenser 200 is coupled to the second pressure-controlled chamber for the dispensing of the elemental atomic objects.

At step/operation 110, the heating component 270 (e.g., heating element) is used to heat the reaction component and the composition and/or partially decomposed composition comprising the atomic objects to cause an atomizing chemical reaction to proceed. For example, the composition and/or partially decomposed composition comprising the atomic objects may be heated to cause the mixture to be heated to the atomizing temperature. For example, the heating component 270 may heat the mixture comprising the atomic objects and the composition and/or partially decomposed composition comprising the atomic objects to an atomizing reaction temperature which may cause the atomizing reaction to occur. In various embodiments, as the atomizing chemical reaction occurs at the atomizing reaction temperature, the atomic objects are dispensed from the dispenser 200. In an example embodiment, the atomizing chemical reaction is completed through a single round of heating the composition and/or partially decomposed composition comprising the atomic objects.

In an example embodiment, where the atomic object is radioactive Barium $^{133}$Ba, the atomizing temperature may be approximately 800° C. Further, in an example embodiment, where the atomic object is radioactive Barium $^{133}$Ba, the atomizing reaction temperature may be in the range of 800 to 1000° C. In various embodiments, heating the crucible to the atomizing reaction temperature causes elemental atomic objects in the mixture to sublimate and be dispensed through the dispensing aperture 219. For example, the elemental atomic objects may vaporize, and/or sublimate and move through the crucible chamber 240 toward the dispensing aperture (e.g., in response to vapor pressure and/or the like within the crucible chamber 240).

Once the elemental atomic objects are dispensed through the dispensing aperture 219, the elemental atomic objects may pass through a load hole and/or the like of an atomic object confinement apparatus 350 (see FIG. 4) and be trapped therein. For example, the dispensing aperture 219 may be aligned with the load hole and/or target component of the atomic object confinement apparatus. For example, an elemental atomic object may be dispensed through the dispensing aperture 219, travel through a load hole and/or the like of an atomic object confinement apparatus and either be trapped (e.g., via one or more electromagnetic fields) as a neutral atom and/or as part of a group of neutral atoms or ionized (e.g., via application of an ionizing laser beam) and trapped as an ion and/or as part of a group of ions. Various actions may be performed on the elemental atomic objects contained within the atomic object confinement apparatus, as appropriate for the application.

Technical Advantages

In various scenarios, it may be desired to dispense elemental atomic objects such that the elemental atomic objects may be trapped and/or confined by an atomic object confinement apparatus, such as an ion trap and/or the like. Moreover, the atomic objects may only be available in small amounts due to various safety and/or cost concerns. For example, the atomic objects may be radioactive and therefore pose a safety concern. Additionally, the atomic objects may not be readily available in elemental form, may readily oxidize, and/or the like. Due to the small amount of atomic objects available, traditional atomic object dispensing methods, such as laser ablation, may not be efficient solutions in these scenarios. Accordingly, a composition comprising the atomic objects may need to undergo a decomposition chemical reaction and/or an atomizing chemical reaction to generate elemental atomic objects. However, the inventors have identified several deficiencies with chemical reaction-based conventional atomic object dispensing methods. Thus, a technical problem exists as to how to dispense such atomic objects.

Various embodiments provide methods, apparatus, systems, and/or the like providing technical solutions to this technical problem. For example, various embodiments provide methods, apparatus, systems, and/or the like for dispensing elemental atomic objects in scenarios where the atomic objects are not readily available in elemental form, may readily oxidize, and/or are available in small amounts (e.g., due to safety and/or cost concerns). As non-limiting examples, various embodiments described herein enable uniform heating across the crucible (e.g., crucible liner) and yields consistent amounts of the elemental atomic objects. Further, various embodiments described herein allows for more starting materials (e.g., reaction component and/or composition comprising the atomic objects) thus advantageously resulting in longer life time, improved efficiency over at least some traditional atomic object dispensing methods. Moreover, example embodiments provide improvements to the fields of dispensing atomic objects and loading atomic objects into atomic object confinement apparatuses (e.g., such as ion traps and/or the like which may be part of a quantum computer and/or other system).

Exemplary Quantum Computer Comprising an Atomic Object Confinement Apparatus

Figure 3:
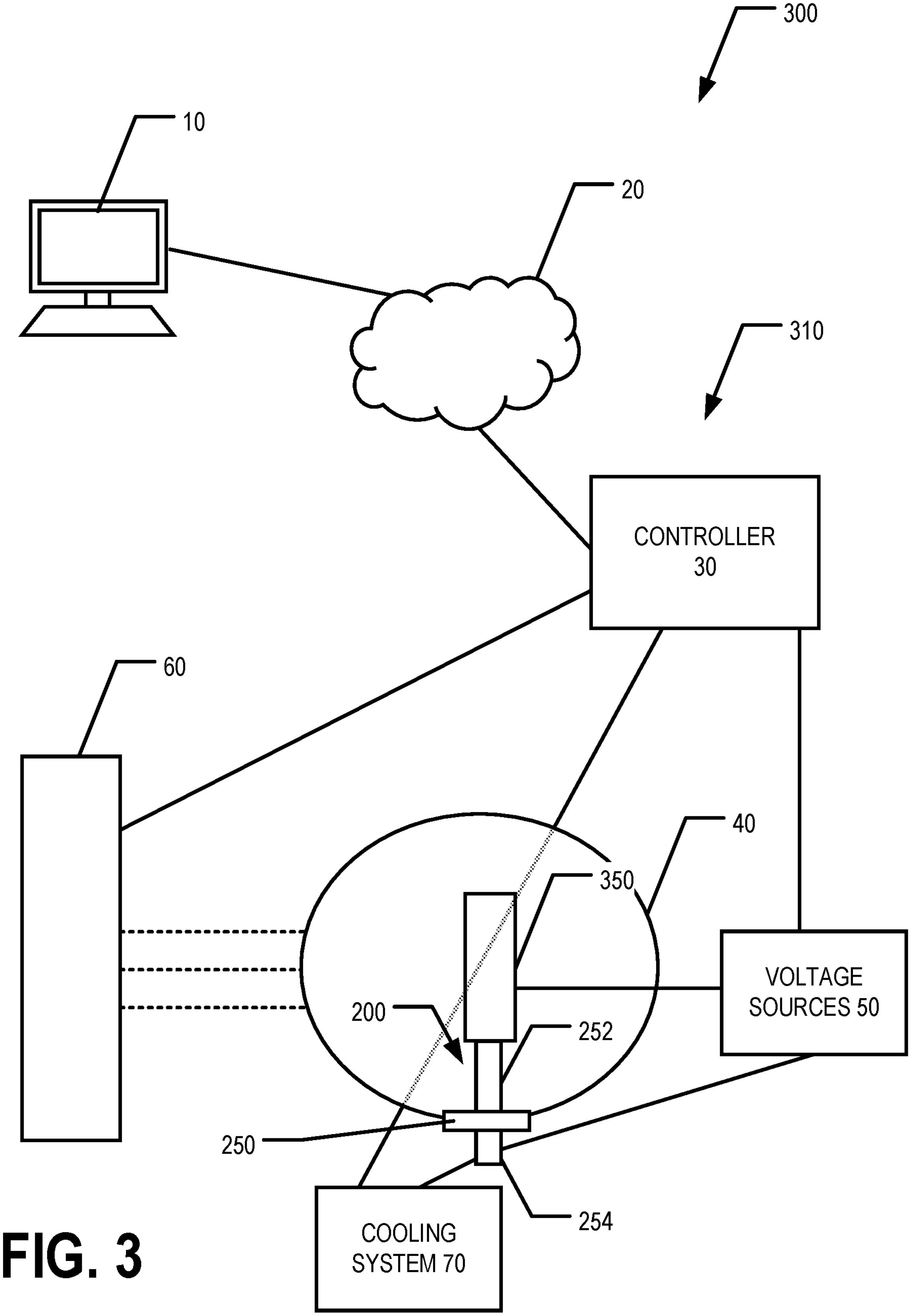
FIG. 3 is a schematic diagram illustrating an example quantum computing system comprising an atomic object confinement apparatus loaded with atomic objects using a dispenser of an example embodiment.

FIG. 3 provides a schematic diagram of an example quantum computer system 300 comprising an atomic object confinement apparatus 350 (e.g., an ion trap and/or the like), in accordance with an example embodiment. In various embodiments, the dispenser 200 may be operated to cause the atomic object confinement apparatus 350 to be loaded with elemental atomic objects. For example, the dispensing aperture 219 of the dispenser 200 may be coupled to a load hole of the atomic object confinement apparatus 350. For example, a controller 30 of the quantum computer system 300 may control operation of the cooling system and one or more voltage sources 50 to cause the operation of the cooling component and the heating component 270 of the dispenser 200 in accordance with an example embodiment, such that the dispenser 200 dispenses elemental atomic objects which are then loaded into and trapped by the atomic object confinement apparatus 350.

In various embodiments, the quantum computer system 300 comprises a computing entity 10 and a quantum computer 310. In various embodiments, the quantum computer 310 comprises a controller 30, a cryostat and/or vacuum chamber 40 enclosing an atomic object confinement apparatus 350 (e.g., ion trap) and a portion 252 of a dispenser 200, and one or more manipulation sources 60. For example, the cryostat and/or vacuum chamber 40 may be the second pressure-controlled chamber. In an example embodiment, the one or more manipulation sources 60 may comprise one or more lasers (e.g., optical lasers, microwave sources, and/or the like). In various embodiments, the one or more manipulation sources 60 are configured to manipulate and/or cause a controlled quantum state evolution of one or more atomic objects within the confinement apparatus. For example, in an example embodiment, wherein the one or more manipulation sources 60 comprise one or more lasers, the lasers may provide one or more laser beams to the confinement apparatus within the cryostat and/or vacuum chamber 40. In various embodiments, the quantum computer 310 comprises one or more voltage sources 50. For example, the voltage sources 50 may comprise a plurality of voltage drivers and/or voltage sources and/or at least one RF driver and/or voltage source. The voltage sources 50 may be electrically coupled to the corresponding potential generating elements (e.g., electrodes) of the atomic object confinement apparatus 350, in an example embodiment.

In various embodiments, a computing entity 10 is configured to allow a user to provide input to the quantum computer 310 (e.g., via a user interface of the computing entity 10) and receive, view, and/or the like output from the quantum computer 310. The computing entity 10 may be in communication with the controller 30 of the quantum computer 310 via one or more wired or wireless networks 20 and/or via direct wired and/or wireless communications. In an example embodiment, the computing entity 10 may translate, configure, format, and/or the like information/data, quantum computing algorithms, and/or the like into a computing language, executable instructions, command sets, and/or the like that the controller 30 can understand and/or implement.

In various embodiments, the controller 30 is configured to control the voltage sources 50, cryostat system and/or vacuum system controlling the temperature and pressure within the cryostat and/or vacuum chamber 40, components of the dispenser 200, manipulation sources 60, and/or other systems controlling various environmental conditions (e.g., temperature, pressure, and/or the like) within the cryostat and/or vacuum chamber 40 and/or configured to manipulate and/or cause a controlled evolution of quantum states of one or more atomic objects within the confinement apparatus. For example, the controller 30 may cause a controlled evolution of quantum states of one or more atomic objects within the confinement apparatus to execute a quantum circuit and/or algorithm. In various embodiments, the atomic objects confined within the confinement apparatus are used as qubits of the quantum computer 310.

Exemplary Controller

In various embodiments, an atomic object confinement apparatus 350 is incorporated into a system (e.g., a quantum computer 310) comprising a controller 30. In various embodiments, the controller 30 configured to control various elements of the system (e.g., quantum computer 310). For example, the controller 30 may be configured to control the voltage sources 50, a cryostat system and/or vacuum system controlling the temperature and pressure within the cryostat and/or vacuum chamber 40, manipulation sources 60, cooling system 70, and/or other systems controlling the environmental conditions (e.g., temperature, humidity, pressure, and/or the like) within the cryostat and/or vacuum chamber 40 and/or configured to manipulate and/or cause a controlled evolution of quantum states of one or more atomic objects within the confinement apparatus.

As shown in FIG. 4, in various embodiments, the controller 30 may comprise various controller elements including processing elements 405, memory 410, driver controller elements 415, a communication interface 420, analog-digital converter elements 425, and/or the like. For example, the processing elements 405 may comprise programmable logic devices (CPLDs), microprocessors, coprocessing entities, application-specific instruction-set processors (ASIPs), integrated circuits, application specific integrated circuits (ASICs), field programmable gate arrays (FPGAs), programmable logic arrays (PLAs), hardware accelerators, other processing devices and/or circuitry, and/or the like. and/or controllers. The term circuitry may refer to an entirely hardware embodiment or a combination of hardware and computer program products. In an example embodiment, the processing element 405 of the controller 30 comprises a clock and/or is in communication with a clock.

For example, the memory 410 may comprise non-transitory memory such as volatile and/or non-volatile memory storage such as one or more of as hard disks, ROM, PROM, EPROM, EEPROM, flash memory, MMCs, SD memory cards, Memory Sticks, CBRAM, PRAM, FeRAM, RRAM, SONOS, racetrack memory, RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. In various embodiments, the memory 410 may store qubit records corresponding the qubits of quantum computer (e.g., in a qubit record data store, qubit record database, qubit record table, and/or the like), a calibration table, an executable queue, computer program code (e.g., in a one or more computer languages, specialized controller language(s), and/or the like), and/or the like. In an example embodiment, execution of at least a portion of the computer program code stored in the memory 410 (e.g., by a processing element 405) causes the controller 30 to perform one or more steps, operations, processes, procedures and/or the like described herein for tracking the phase of an atomic object within an atomic system and causing the adjustment of the phase of one or more manipulation sources and/or signal(s) generated thereby.

In various embodiments, the driver controller elements 415 may include one or more drivers and/or controller elements each configured to control one or more drivers. In various embodiments, the driver controller elements 415 may comprise drivers and/or driver controllers. For example, the driver controllers may be configured to cause one or more corresponding drivers to be operated in accordance with executable instructions, commands, and/or the like scheduled and executed by the controller 30 (e.g., by the processing element 405). In various embodiments, the driver controller elements 415 may enable the controller 30 to operate a voltage source 50, manipulation source 60, cooling system 70, and/or the like. In various embodiments, the drivers may be laser drivers; vacuum component drivers; drivers for controlling the flow of current and/or voltage applied to electrodes used for maintaining and/or controlling the trapping potential of the atomic object confinement apparatus 350 (and/or other driver for providing driver action sequences to potential generating elements of the confinement apparatus) and/or the flow of current and/or voltage applied to a heating component 270 of a dispenser 200; cryostat and/or vacuum system component drivers; cooling system drivers, and/or the like. In various embodiments, the controller 30 comprises means for communicating and/or receiving signals from one or more optical receiver components such as cameras, MEMs cameras, CCD cameras, photodiodes, photomultiplier tubes, and/or the like. For example, the controller 30 may comprise one or more analog-digital converter elements 425 configured to receive signals from one or more optical receiver components, calibration sensors, and/or the like.

In various embodiments, the controller 30 may comprise a communication interface 420 for interfacing and/or communicating with a computing entity 10. For example, the controller 30 may comprise a communication interface 420 for receiving executable instructions, command sets, and/or the like from the computing entity 10 and providing output received from the quantum computer 310 (e.g., from an optical collection system) and/or the result of a processing the output to the computing entity 10. In various embodiments, the computing entity 10 and the controller 30 may communicate via a direct wired and/or wireless connection and/or one or more wired and/or wireless networks 20.

Exemplary Computing Entity

FIG. 5 provides an illustrative schematic representative of an example computing entity 10 that can be used in conjunction with embodiments of the present invention. In various embodiments, a computing entity 10 is configured to allow a user to provide input to the quantum computer 310 (e.g., via a user interface of the computing entity 10) and receive, display, analyze, and/or the like output from the quantum computer 310.

As shown in FIG. 5, a computing entity 10 can include an antenna 512, a transmitter 504 (e.g., radio), a receiver 506 (e.g., radio), and a processing element 508 that provides signals to and receives signals from the transmitter 504 and receiver 506, respectively. The signals provided to and received from the transmitter 504 and the receiver 506, respectively, may include signaling information/data in accordance with an air interface standard of applicable wireless systems to communicate with various entities, such as a controller 30, other computing entities 10, and/or the like. In this regard, the computing entity 10 may be capable of operating with one or more air interface standards, communication protocols, modulation types, and access types. For example, the computing entity 10 may be configured to receive and/or provide communications using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 10 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol. The computing entity 10 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

Via these communication standards and protocols, the computing entity 10 can communicate with various other entities using concepts such as Unstructured Supplementary Service information/data (US SD), Short Message Service (SMS), Multimedia Messaging Service (MIMS), Dual-Tone Multi-Frequency Signaling (DTIVIF), and/or Subscriber Identity Module Dialer (SIM dialer). The computing entity 10 can also download changes, add-ons, and updates, for instance, to its firmware, software (e.g., including executable instructions, applications, program modules), and operating system.

The computing entity 10 may also comprise a user interface device comprising one or more user input/output interfaces (e.g., a display 516 and/or speaker/speaker driver coupled to a processing element 508 and a touch screen, keyboard, mouse, and/or microphone coupled to a processing element 508). For instance, the user output interface may be configured to provide an application, browser, user interface, interface, dashboard, screen, webpage, page, and/or similar words used herein interchangeably executing on and/or accessible via the computing entity 10 to cause display or audible presentation of information/data and for interaction therewith via one or more user input interfaces. The user input interface can comprise any of a number of devices allowing the computing entity 10 to receive data, such as a keypad 518 (hard or soft), a touch display, voice/speech or motion interfaces, scanners, readers, or other input device. In embodiments including a keypad 518, the keypad 518 can include (or cause display of) the conventional numeric (0-9) and related keys (#, *), and other keys used for operating the computing entity 10 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the computing entity 10 can collect information/data, user interaction/input, and/or the like.

The computing entity 10 can also include volatile storage or memory 522 and/or non-volatile storage or memory 524, which can be embedded and/or may be removable. For instance, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the computing entity 10.

CONCLUSION

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for dispensing atomic objects, the method comprising:

depositing a reaction component and a composition comprising the atomic objects inside a crucible chamber of a crucible, wherein the composition comprising the atomic object is an aqueous solution, and wherein the crucible is disposed within a pressure-controlled chamber; and heating the composition comprising the atomic objects with the reaction component to an atomizing reaction temperature that is less than 900° C. to cause an atomizing chemical reaction to occur, wherein (a) the reaction component comprises tantalum powder that is a reducing agent in the atomizing chemical reaction, (b) a result of the atomizing chemical reaction is elemental atomic objects generated from the composition comprising the atomic objects, and (c) the elemental atomic objects are dispensed during the atomizing chemical reaction.

2. The method of claim 1, wherein the atomizing chemical reaction is a reduction reaction.

3. The method of claim 1, wherein the atomic objects are barium atoms.

4. The method of claim 1, wherein the atomic objects are barium atoms and the atomizing reaction temperature is approximately 800° C.

5. The method of claim 1, further comprising, before causing the atomizing chemical reaction, heating the crucible to a decomposition reaction temperature to cause a decomposition chemical reaction to occur, wherein the atomizing chemical reaction is performed using at least a portion of molecules generated by the decomposition chemical reaction.

6. The method of claim 5, wherein the decomposition reaction temperature is approximately 600° C.

7. The method of claim 5, wherein a dispenser is coupled to a first pressure-controlled chamber during the decomposition chemical reaction and coupled to a second pressure-controlled chamber during dispensing of the atomic objects.

8. The method of claim 1, further comprising:

before causing the atomizing chemical reaction, heating the crucible to a degassing temperature for a duration of at least one hour.

9. The method of claim 1, wherein the atomic objects are radioactive.

10. The method of claim 1, further comprising trapping dispensed elemental atomic objects using an atomic object confinement apparatus.

11. The method of claim 10, wherein the atomic object confinement apparatus is a component of a quantum computer.

12. The method of claim 10, wherein the composition comprising the atomic objects is an aqueous solution.

13. The method of claim 1, wherein the atomic objects are barium atoms and the composition comprising the atomic objects is barium nitrate.

14. The method of claim 8, wherein the degassing temperature is about 200° C.

* * * * *